May 27, 1969     J. D. JENKS     3,447,031
CONTROLLED SWITCH FLASHER
Filed Aug. 22, 1967
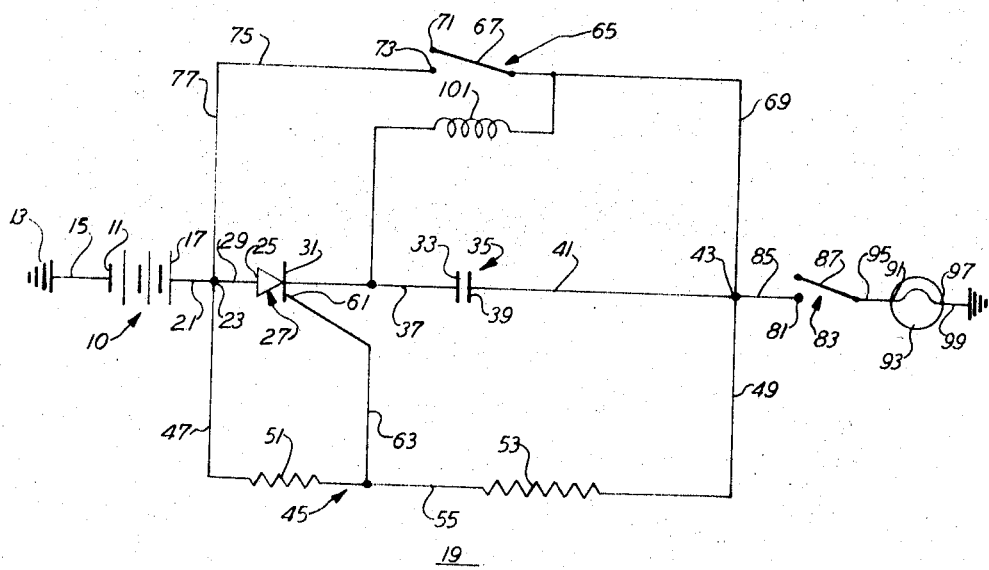
JOHN D. JENKS
INVENTOR
BY *John R. Faulkner*
*Beach L. Gerschling*
ATTORNEYS

United States Patent Office 3,447,031
Patented May 27, 1969

3,447,031
CONTROLLED SWITCH FLASHER
John D. Jenks, Dearborn, Mich., assignor to Ford Motor Company, Dearborn, Mich., a corporation of Delaware
Filed Aug. 22, 1967, Ser. No. 662,364
Int. Cl. H05b *41/30*
U.S. Cl. 315—209                8 Claims

ABSTRACT OF THE DISCLOSURE

A controlled switch flasher comprising a two terminal solid state operated device in which a lamp is intermittently energized by means of a solid state switching device, preferably in the form of a gate controlled rectifier, and other components when the lamp is connected to the circuit.

BACKGROUND OF THE INVENTION

There have been numerous proposed controlled switch flasher devices in the prior art that are employed to intermittently energize a lamp for various purposes. One of these purposes, of course, is to control the turn signal lamps in an automotive vehicle and the present invention is ideally suited for this purpose.

A number of these controlled switch flashers utilize solid state components, including transistors, that are alternately biased to conducting and non-conducting states by various circuit components coupled to the emitter, collector and base of the transistor. All of them, however, suffer from the fact that they need to be connected into a circuit with a source of electrical energy and the lamp to be energized by numerous terminals. Moreover, they are complex in nature and require a great number of components in order to function properly.

The present invention remedies the above-mentioned difficulties by providing a two terminal controlled switch flasher having a solid state switching component and a minimum of operable parts to intermittently energize the lamp by alternately biasing the solid state switching component, which preferably comprises a gate controlled rectifier, into conducting and non-conducting states.

SUMMARY OF THE INVENTION

The present invention comprises a source of electrical energy that may be alternately and periodically coupled to a lamp to be energized through a controlled switch flasher using a solid state switching device, preferably a gate controlled rectifier. The solid state switching device is biased to its conducting state when a switch to the lamp is closed through a voltage divider having a high impedance or resistance which will prevent the illumination of the lamp through the biasing circuit. The biasing circuit switches the solid state switching device or gate controlled rectifier to a conducting state and this controlled rectifier is connected in series with a capacitor. The capacitor in turn is connected with the anode and cathode of the controlled rectifier in series with the source of electrical energy and with the lamp to be controlled. It is understood, of course, that various other alternative arrangements of circuitry would be apparent to those skilled in the art.

A relay having a winding and an armature is also coupled in circuit with the capacitor, the source of electrical energy and the lamp to be energized. When the controlled rectifier is biased to a conducting state, it charges the capacitor and this in turn applies a voltage across the winding of the relay which is coupled across the capacitor to a point where the pull-in voltage of the relay is reached. When this happens, the armature of the relay closes and directly couples the source of electrical energy to the lamp to be energized thereby illuminating the lamp. Simultaneously, it applies the voltage of the source of electrical energy to one plate of the capacitor in such a manner as to backbias the controlled rectifier to a non-conducting state. When this happens, the capacitor discharges through the winding of the relay and when the drop-out voltage of the relay is reached, the relay will open thereby de-energizing the lamp to be energized.

Subsequently, the voltage divider or other biasing network coupled to the source of electrical energy and the gate electrode of the controlled rectifier again becomes operative to bias the controlled rectifier into the conducting state. This again charges the capacitor and closes the relay to thereby energize the lamp. This cycle repeats as long as the controlled switch flasher is connected to the source of electrical energy.

An object of this invention is the provision of a simple and inexpensive controlled switch flasher that will intermittently energize a lamp.

A further object of this invention is the provision of a controlled switch flasher using a minimum of parts and including a solid state switching device for the intermittent energization of a lamp to be energized.

Other objects and attendant advantages of the present invention may be more readily realized as the specification is read in connection with the attached drawing which shows a circuit diagram of the controlled switch flasher of the present invention.

Referring now to that drawing, there is shown a source of electrical energy 10 which may be in the form of a conventional storage battery having a negative terminal 11 connected to ground 13 by means of a lead 15. The positive terminal 17 of the source of electrical energy 10 is connected to a controlled switch flasher circuit 19 through a lead 21 that is connected to a junction 23.

The junction 23 is connected to the anode 25 of a solid state switching device 27, preferably in the form of a controlled rectifier, through a lead 29. The cathode 31 of the solid state switching device or gaate controlled rectifier 27 is connected to one plate 33 of a capacitor 35 through a lead 37. The other plate 39 of the capacitor 35 is connected through a lead 41 to a junction 43 of the controlled switch flasher circuit 19.

A control circuit 45, preferably in the form of a voltage divider, is coupled between the junctions 23 and 43 by by leads 47 and 49, respectively. This control circuit comprises a first resistor 51 and a second resistor 53 connected by a lead 55. The lead 55, positioned between the resistor 51 and the resistor 53, is connected to a gate electrode 61 of the controlled rectifier or solid state switching device 27 through a lead 63.

The controlled switch flasher circuit 19 also includes a relay 65 having a normally open armature 67 which is coupled to the junction 43 by a lead 69. This armature has a contact 71 which is adapted to come into engagement with a contact 73 when the relay is closed, and the contact 73 is connected to the junction 23 by means of a lead 75 and a lead 77.

The junction 43 of the controlled switch flasher circuit 19 is connected to a contact 81 of a switch 83 through a lead 85 and the switch 83 also comprises a normally open blade or equivalent movable means 87 which is connected to one terminal 91 of a lamp 93 through a lead 95. The other terminal 97 of the lamp 93 is connected to ground through a lead 99.

The relay 65 also includes a winding 101 having one end connected to the lead 37 and the other end connected to the lead 69. As a result, the winding 101 is connected across the capacitor 35. When the voltage across the capacitor 35 and hence, the relay 101 reaches a predetermined level, the armature 67 will close and when it is reduced to a lower level, the armature 67 will open.

Operation

In the operation of the controlled switch flasher of the present invention, the switch 83 connected to the lamp 93 and the junction 43 will be closed when it is desired to intermittently energize the lamp 93. As a result, the positive terminal 17 of the battery 10 is connected to the voltage divider 45 in series circuit with the switch 83 and the lamp 93 and current will flow through the resistor 51 and the resistor 53. These resistors have values such that a negative voltage is applied to the gate electrode 61 of the solid state switching device or controlled rectifier 27 with respect to the anode 25, thereby biasing the gate controlled rectifier or solid state switching device 27 into its conducting state. For example, the resistor 51 may have a value of approximately 900 ohms while the resistor 53 may have a value of approximately 50 ohms. The combined resistance of the two resistors 51 and 53 is such that insufficient current will flow to cause the illumination of the lamp 93.

As previously brought out, however, the solid state switching device or controlled rectifier 27 is biased into its conducting state thereby allowing current to flow from the positive terminal 17 of the battery 10 through the lead 21, through the anode 25 and the cathode 31 to the capacitor 35. This charges the capacitor 35 so that the plate 33 is positive with respect to the plate 39 and as current continues to flow, a voltage will be built up across the capacitor 35 and hence, across the winding 101 of the relay 65 sufficient to cause the armature 67 to close thereby bringing the contacts 71 and 73 into engagement. When these two contacts come into engagement, the positive terminal 17 of the source of electrical energy or battery 10 is directly connected to the lamp 93 and the lamp is energized. This is brought about through the lead 21, junction 23, lead 77, lead 75, contact 73, contact 71, armature 67, lead 69, junction 43, lead 85, contact 81, blade 87 or other movable portion of the swtch 83 and the lead 95 that is connected to the terminal 91. The other terminal 97 of the lamp 93 is, of course, grounded through the lead 99.

It can also be appreciated that when the armature 67 closes so that the contacts 71 and 73 come into engagement with one another, the junction 43 is connected to the positive terminal 17 of the battery 10 through the circuit previously described, thereby applying the potential of the positive terminal 17 of the battery to the plate 39 of the capacitor 35. This voltage is, therefore, added to the previous voltage built up across the capacictor 35 as the result of current flow through the controlled rectifier or solid state switching device 27. As a result, the cathode 31 has applied to it a higher potential than the anode 25 thereby backbiasing the solid state switching device or controlled rectifier 27 and switching it to its non-conductive state. When this happens, the capacitor 35 is discharged through the winding 101 of the relay 65 thereby causing the voltage across the relay winding to be reduced depending upon the time constant of the circuit which includes the capacitor 35 and the relay winding 101. After a period of time, depending upon this time constant, the drop-out voltage of the relay 65 is reached and as a result, the armature 67 opens thereby disengaging the contacts 71 and 73. When the contacts 71 and 73 open, the direct circuit to the lamp 93 is opened and the lamp 93, therefore, is de-energized and will come to a non-illuminated state.

At this time, that is, when the contacts 71 and 73 open, current again flows through the voltage divider 45 applying the proper potential to the gate electrode 61 of the controlled rectifier or solid state switching device 27 to thereby switch it to a conductive state, charging the capacitor 35 and closing the relay 65 as previously described. When this happens, of course, the lamp 93 is again illuminated. Subsequently, as brought out above, the potential of the electrode 17 of the source of electrical energy or battery 10 is applied to the junction 43 as a result of the closure of the relay 65 thereby backbiasing the solid state switching device or controlled rectifier 27 and biasing it to a non-conductive state. The capacitor is then again discharged through the winding 101 of the relay 65 and when the drop-out voltage is reached, the relay 65 opens and the lamp 93 is again de-energized. The above-mentioned cycle will continue as long as the switch 83 is closed thereby periodically and intermittently energizing the lamp 93.

It can be appreciated, therefore, that the above-described controlled switch flasher for intermittently energizing a lamp includes inexpensive circuit elements which are connected in a way to provide maximum economy. It also can be appreciated that the controlled switch flasher circuit of the present invention is a two terminal device which may be readily employed as a flasher for flashing the turn signal lamps of an automotive vehicle. In this case, the switch 83 which is shown in diagrammatic form is representative of the turn signal control switches for the automotive vehicle.

While many modifications of the invention will be obvious to one skilled in the art in view of the teachings of this specification, it is intended that all such modifications which fall within the true spirit and scope of this invention be included within the scope of the appended claims.

What is claimed is:

1. A two terminal lamp flashing circuit having a first terminal and a second terminal, a source of electrical energy connected to one terminal and a lamp connected to the other terminal, first circuit means connected across said first and said second terminal for periodically and directly coupling said source of electrical energy to said lamp, second circuit means connected across said first terminal and said second terminal comprising a solid state switching device and an energy storage device, said solid state switching device being rendered conductive to energize said energy storage device to an energy level sufficent to cause said first circuit means to be rendered conductive and directly coupling said source of electrical energy to said lamp and means coupled to said solid state switching device for alternately switching said solid state switching device between conducting and non-conducting states.

2. The combination of claim 1 in which said solid state switching device comprises a gate controlled rectifier having a gate electrode and means coupled to said gate electrode and in series with said source of electrical energy and said lamp for applying a voltage to said gate electrode to cause conduction of said gate controlled rectifier.

3. The combination of claim 1 in which said solid state switching device comprise a gate controlled rectifier having an anode, a cathode and a gate, said energy storage device comprising a capacitor connected in series with said anode and cathode, a relay winding connected across said capacitor and said first circuit means including an armature operated by said relay winding, said armature when closed directly coupling said battery with said lamp.

4. The combination of claim 3 in which said relay armature when closed couples the plate of said capacitor connected to said cathode of said gate controlled rectifier with said source of electrical energy to backbias said controlled rectifier and switch said controlled rectifier to a non-conducting state.

5. The combination of claim 4 in which said capacitor discharges through said relay winding to open said armature when the drop-out voltage of said relay has been reached.

6. The combination of claim 2 in which said means coupled to said gate electrode and in series with said source of electrical energy and said lamp comprises a voltage divider having a sufficiently high resistance to prevent illumination of said lamp.

7. A lamp flashing circuit for intermittently energizing a signal lamp comprising a source of electrical energy, a controlled rectifier having an anode, a cathode and a gate, a capacitor, said anode, cathode and capacitor connected in series with said source of electrical energy, a switch, a relay including a winding and an armature, said winding connected across said capacitor, and means connected in series with said source of electrical energy and coupled to said gate for applying a voltage to said gate to bias said controlled rectifier into conduction when said switch is closed, current flow through said controlled rectifier applying a voltage across said capacitor and said winding sufficient to close said armature, circuit means directly connecting said source of electrical energy to said lamp through said armature and said switch when said relay armature is closed and circuit means connecting said source of electrical energy and said capacitor to apply a backbias on said controlled rectifier when said armature is closed.

8. The combination of claim 7 in which said first mentioned means comprises a voltage divider having a sufficiently high resistance to prevent energization of said lamp when said voltage divider is energized.

References Cited

UNITED STATES PATENTS

| | | | |
|---|---|---|---|
| 2,880,370 | 3/1959 | Arrasmith et al. | 315—72 |
| 3,084,338 | 4/1963 | Mauer et al. | 340—331 X |
| 3,089,060 | 5/1963 | Horino | 315—224 |
| 3,113,242 | 12/1963 | Leeder | 315—209 |
| 3,143,729 | 8/1964 | Power | 315—244 X |
| 3,204,146 | 8/1965 | Kratochvil | 315—209 |
| 3,268,765 | 8/1966 | Randolph | 315—209 |
| 3,281,611 | 10/1966 | Leeder | 307—132 |
| 3,376,472 | 4/1968 | Taylor et al. | 315—200 X |

JOHN W. HUCKERT, *Primary Examiner.*

R. F. POLISSACK, *Assistant Examiner.*

U.S. Cl. X.R.

307—252; 315—77, 200, 240, 362; 317—148.5, 149, 151; 340—331